United States Patent
Surnilla et al.

(10) Patent No.: US 9,435,251 B2
(45) Date of Patent: *Sep. 6, 2016

(54) METHOD FOR ESTIMATING CHARGE AIR COOLER CONDENSATION STORAGE AND/OR RELEASE WITH AN INTAKE OXYGEN SENSOR

(71) Applicant: Ford Global Technologies, LLC, Dearborn, MI (US)

(72) Inventors: Gopichandra Surnilla, West Bloomfield, MI (US); Dan A. Makled, Dearborn, MI (US); Richard E. Soltis, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

This patent is subject to a terminal disclaimer.

(21) Appl. No.: 13/967,968

(22) Filed: Aug. 15, 2013

(65) Prior Publication Data
US 2015/0047603 A1    Feb. 19, 2015

(51) Int. Cl.
| F02B 29/04 | (2006.01) |
| F02D 41/00 | (2006.01) |
| F02D 41/14 | (2006.01) |
| F02B 29/00 | (2006.01) |

(52) U.S. Cl.
CPC ........... F02B 29/0468 (2013.01); F02B 29/04 (2013.01); F02D 41/0007 (2013.01); F02D 41/1456 (2013.01); F02D 2200/0418 (2013.01); Y02T 10/144 (2013.01)

(58) Field of Classification Search
CPC .... F02B 29/0468; F02B 29/04; F02B 29/02; F02B 29/045; F02D 41/0007
USPC ........................ 123/563, 564, 559.1
See application file for complete search history.

(56) References Cited

U.S. PATENT DOCUMENTS

| 6,725,848 | B2 | 4/2004 | Ramamurthy et al. |
| 6,948,475 | B1 | 9/2005 | Wong et al. |
| 8,464,520 | B2 | 6/2013 | Chen et al. |
| 8,522,760 | B2 | 9/2013 | Soltis |
| 2011/0132342 | A1* | 6/2011 | Soltis .................. F02D 41/0025 123/703 |
| 2011/0155112 | A1* | 6/2011 | Schiestl ............. F02B 29/0418 123/672 |
| 2014/0075976 | A1* | 3/2014 | Glugla ................ F02B 29/0418 62/150 |
| 2014/0109568 | A1* | 4/2014 | Glugla .................... F02P 5/045 60/599 |
| 2015/0136095 | A1* | 5/2015 | Ante ................ F02M 35/10373 123/568.12 |

OTHER PUBLICATIONS

Surnilla, Gopichandra et al., "Exhaust Humidity Sensor," U.S. Appl. No. 13/706,194, Filed Dec. 5, 2012, 34 pages.
Hilditch, James Alfred et al., "Low-Pressure EGR Control During Compressor Bypass Valve Operation," U.S. Appl. No. 13/746,232, Filed Jan. 21, 2013, 36 pages.

(Continued)

*Primary Examiner* — Mahmoud Gimie
(74) *Attorney, Agent, or Firm* — Julia Voutyras; Alleman Hall McCoy Russell & Tuttle LLP

(57) ABSTRACT

Methods and systems are provided for estimating water storage in a charge air cooler (CAC). In one example, an amount of water in charge air exiting the CAC may be based on an output of an oxygen sensor positioned downstream of the CAC. Further, engine actuators may be adjusted to increase combustion stability and/or reduce condensate formation based on the amount of water exiting the CAC.

20 Claims, 7 Drawing Sheets

(56) References Cited

OTHER PUBLICATIONS

Surnilla, Gopichandra et al., "Intake Air Oxygen Compensation for EGR," U.S. Appl. No. 13/789,182, Filed Mar. 7, 2013, 32 pages.
Brostrom, Patrick et al., "Engine Fuel Pump and Method for Operation Thereof," U.S. Appl. No. 13/950,181, Filed Jul. 24, 2013, 34 pages.
Rollinger, John Eric et al., "Method for Estimating Charge Air Cooler Condensation Storage and/or Release with Two Intake Oxygen Sensors," U.S. Appl. No. 13/967,943, Filed Aug. 15, 2013, 58 pages.

* cited by examiner

METHOD FOR ESTIMATING CHARGE AIR COOLER CONDENSATION STORAGE AND/OR RELEASE WITH AN INTAKE OXYGEN SENSOR

BACKGROUND/SUMMARY

Turbocharged and supercharged engines may be configured to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point. Condensate may collect at the bottom of the CAC, or in the internal passages, and cooling turbulators. Under certain air flow conditions, condensate may exit the CAC and enter an intake manifold of the engine as water droplets. If too much condensate is ingested by the engine, engine misfire and/or combustion instability may occur.

Other attempts to address engine misfire due to condensate ingestion include avoiding condensate build-up. In one example, the cooling efficiency of the CAC may be decreased in order to reduce condensate formation. However, the inventors herein have recognized potential issues with such methods. Specifically, while some methods may reduce or slow condensate formation in the CAC, condensate may still build up over time. If this build-up cannot be stopped, ingestion of the condensate during acceleration may cause engine misfire. Additionally, in another example, engine actuators may be adjusted to increase combustion stability during condensate ingestion. In one example, the condensate ingestion may be based on a mass air flow rate and amount of condensate in the CAC; however, these parameters may not accurately reflect the amount of water in the charge air exiting the CAC and entering the intake manifold. As a result, engine misfire and/or unstable combustion may still occur.

In one example, the issues described above may be addressed by a method for adjusting engine actuators based on an amount of water in charge air exiting a charge air cooler, the amount of water based on an output of an oxygen sensor positioned downstream of the charge air cooler (CAC). Specifically, the oxygen sensor may be positioned at an outlet of the CAC. The oxygen sensor may be operated in either a variable voltage mode or a base mode based on exhaust gas recirculation (EGR) flow. For example, if EGR flow is greater than a threshold, the oxygen sensor may operate in the variable voltage mode to measure oxygen content of the charge air at the outlet of the CAC. The amount of water in the charge air exiting the CAC may then be determined based on a pumping current of the oxygen sensor. For example, a saturation water value at an outlet temperature condition of the CAC may be subtracted from the total water measured by the oxygen sensor to determine the amount of water in the form of droplets in the charge air. An engine controller may then adjust engine actuators to increase combustion stability in response to the amount of water in the charge air exiting the CAC. For example, the controller may adjust spark timing to increase combustion stability during the ingestion of the determined amount of water. In this way, engine misfire and combustion instability due to water ingestion may be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
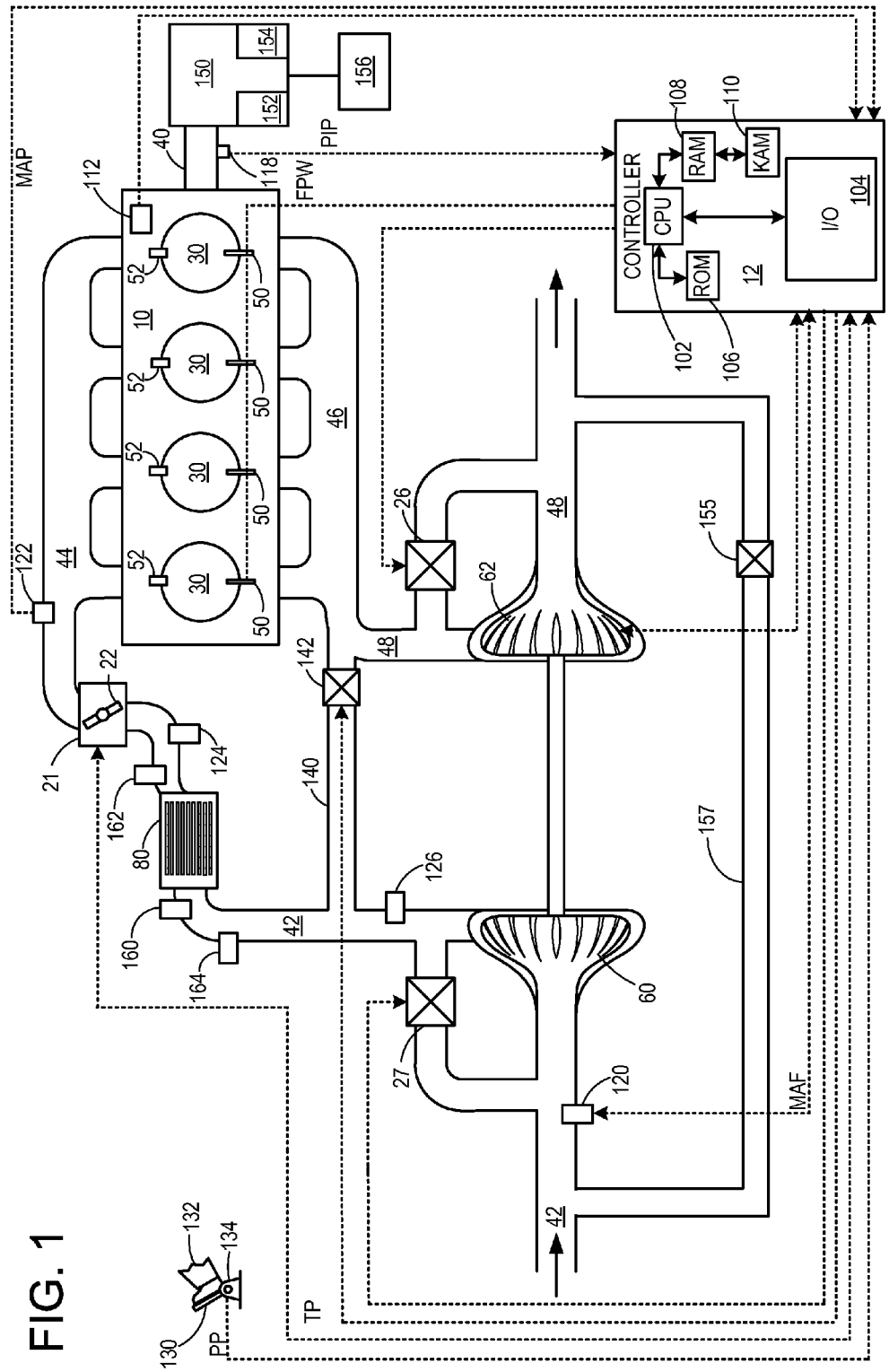
FIG. 1 is a schematic diagram of an example engine system including a charge air cooler.
Figure 2:
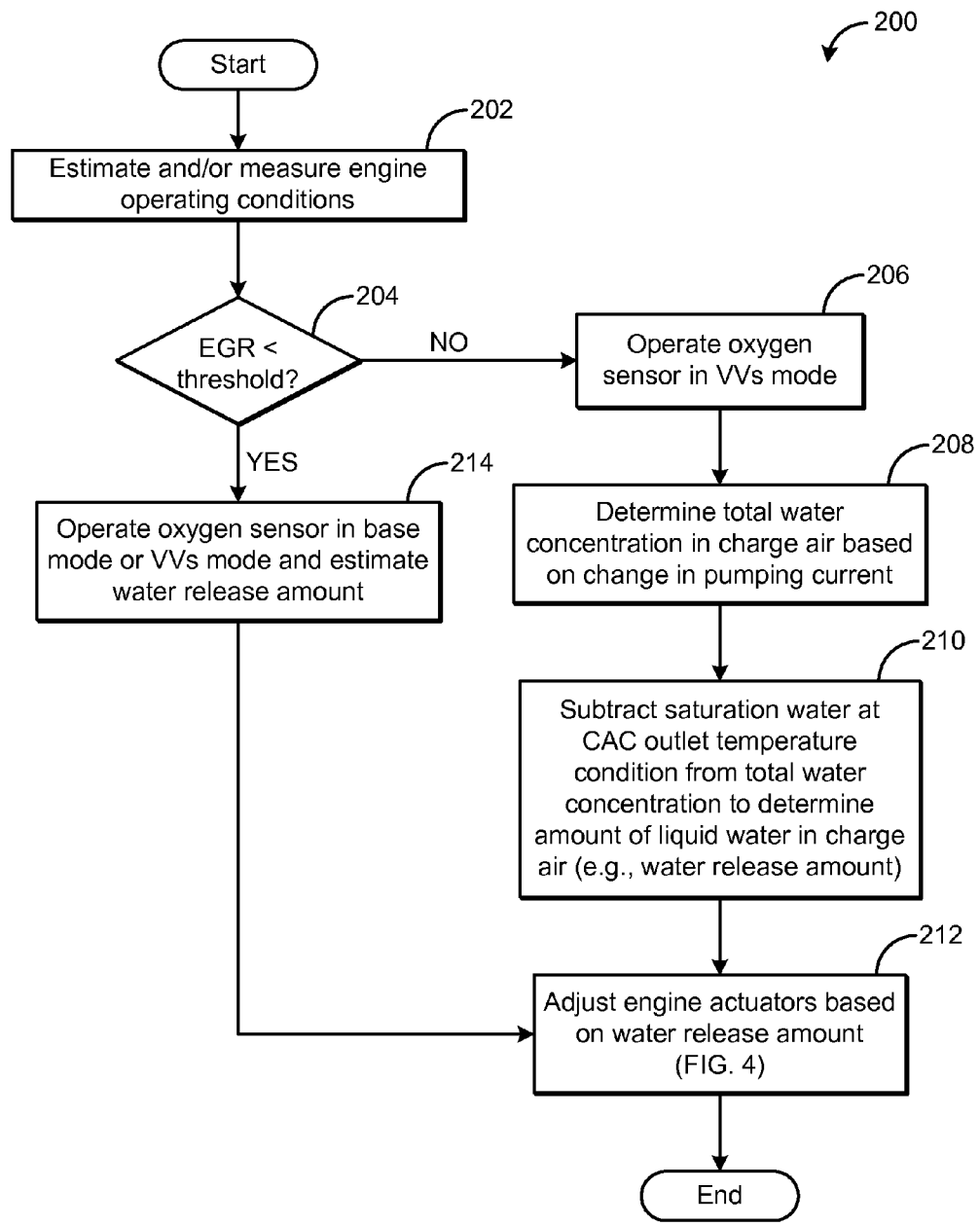
FIG. 2 is a flow chart of a method for operating an oxygen sensor to determine water storage at a charge air cooler.
Figure 3:
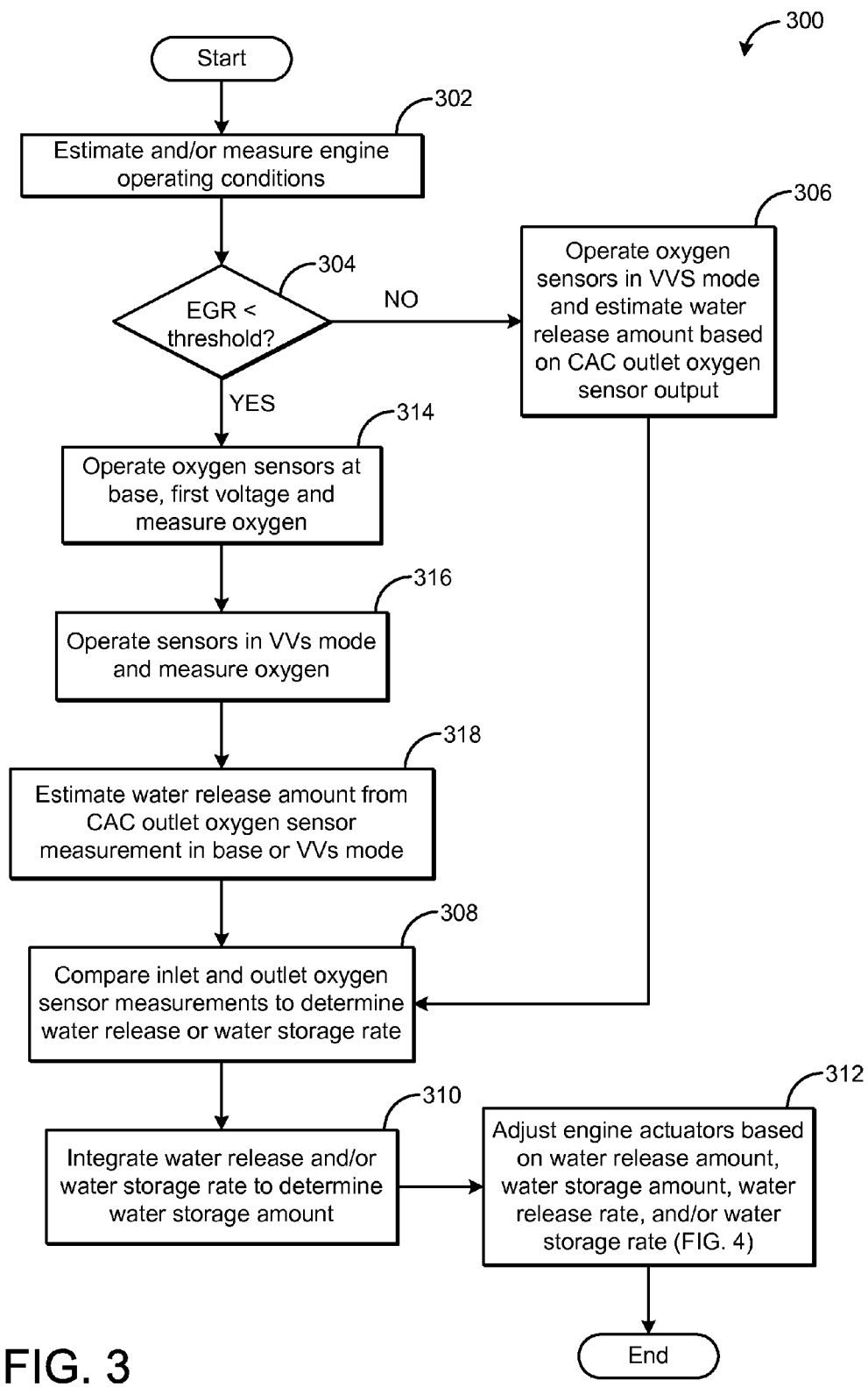
FIG. 3 is a flow chart of a method for operating oxygen sensors to determine water storage at a charge air cooler.
Figure 4:
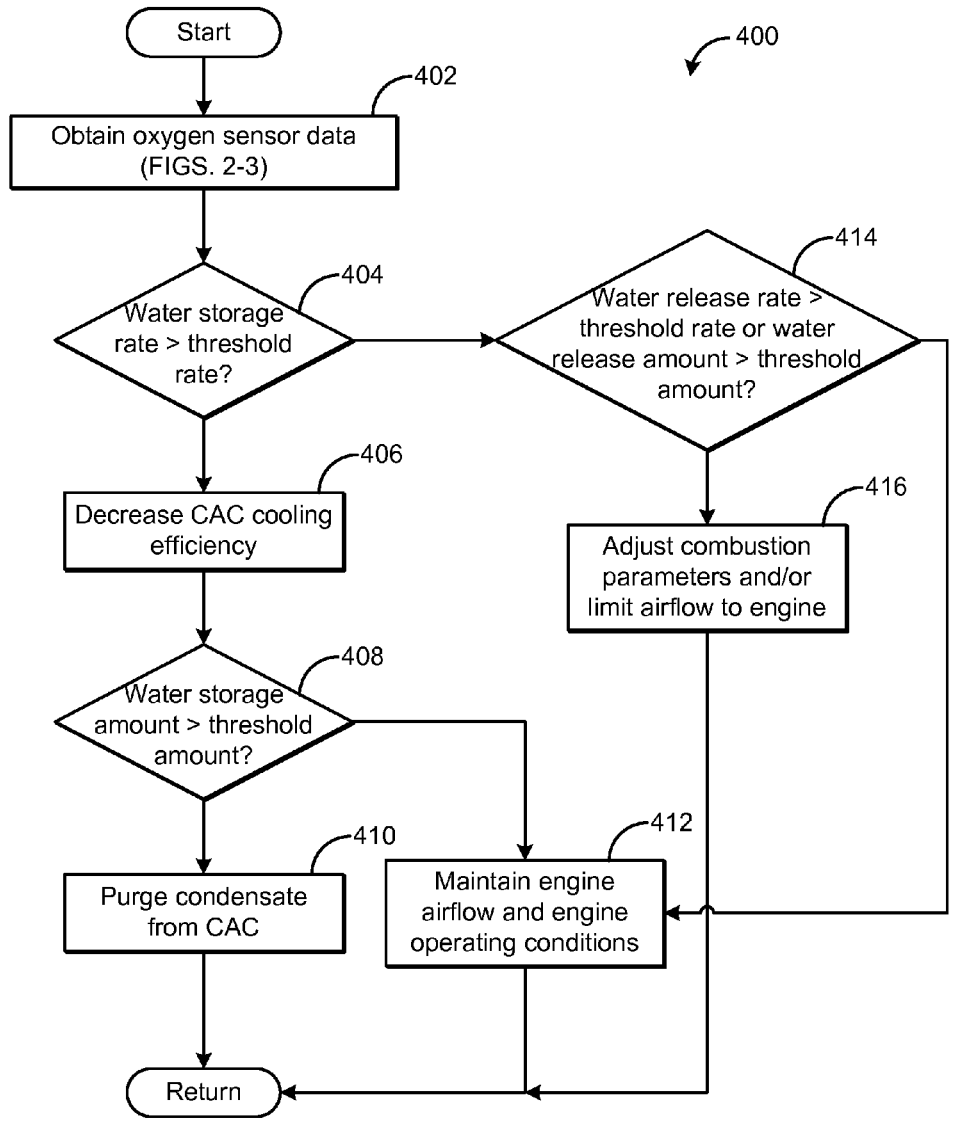
FIG. 4 is a flow chart of a method for adjusting engine operation based on water storage at a charge air cooler.
Figure 5:
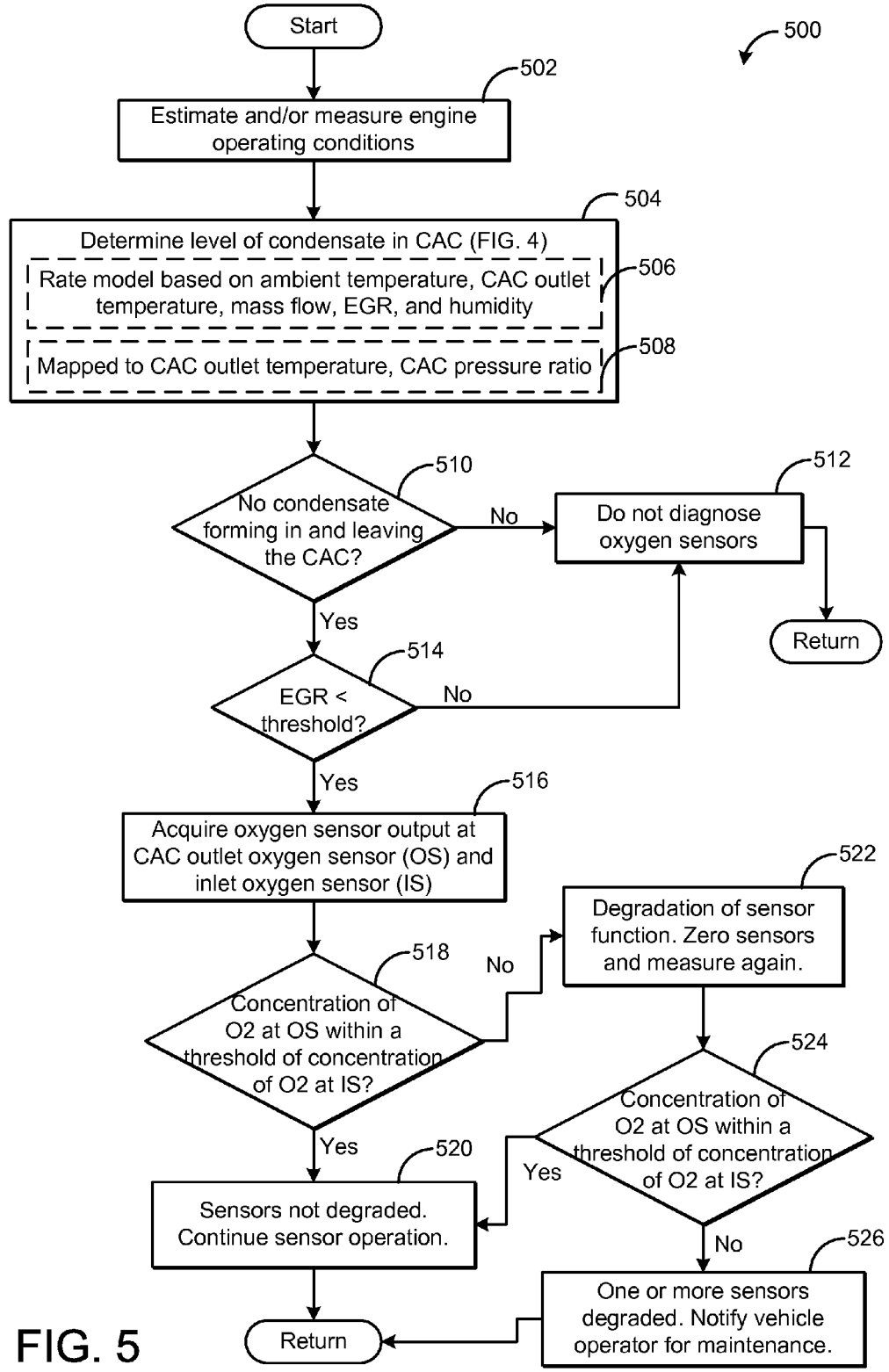
FIG. 5 is a flow chart of a method for indicating degradation of a first oxygen sensor positioned at an outlet of a CAC and a second oxygen sensor positioned at an inlet of the CAC based on engine operating conditions.
Figure 6:
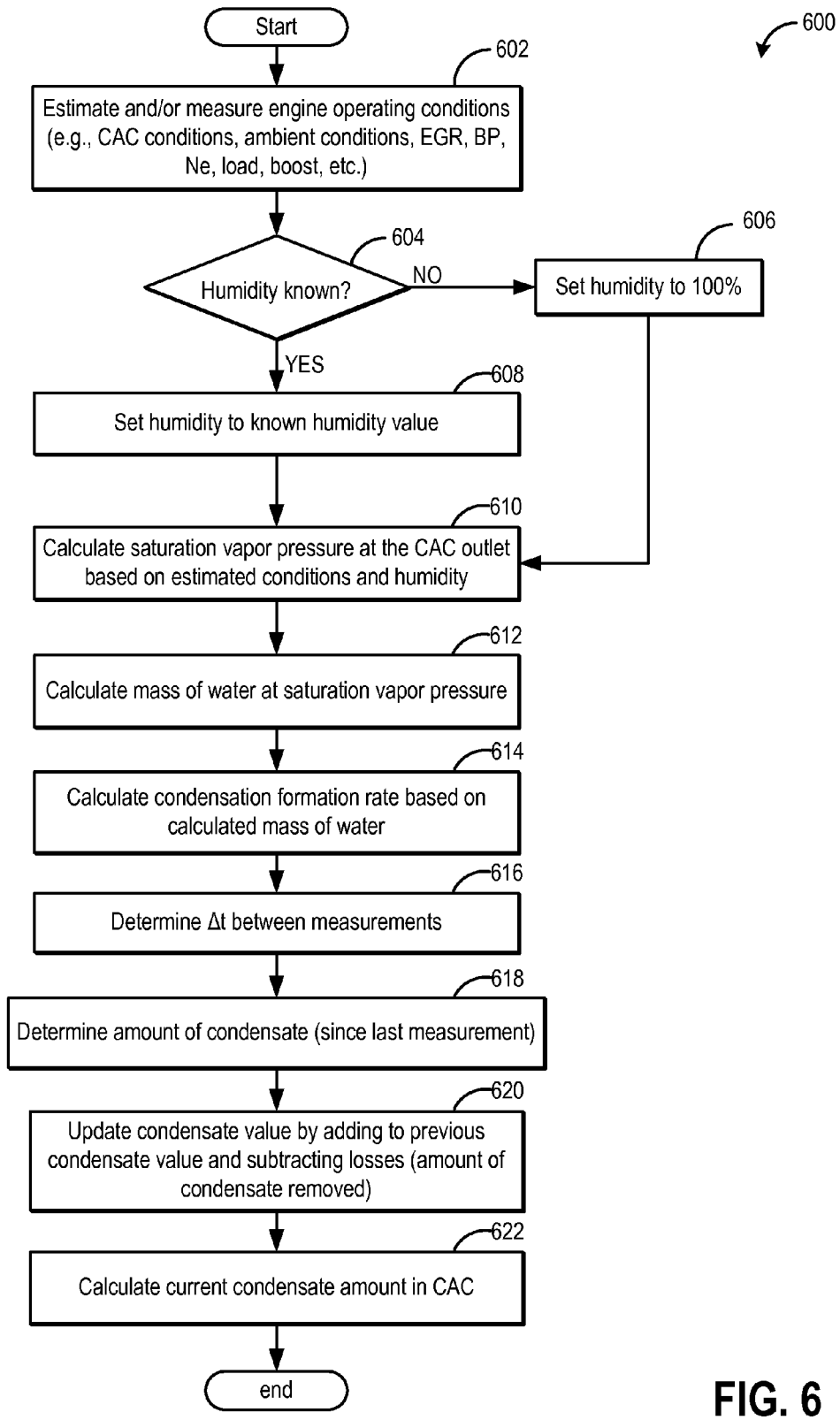
FIG. 6 shows a flow chart illustrating a method for inferring a condensate level at the charge air cooler.

The following description relates to systems and methods for estimating water storage in a charge air cooler (CAC) in an engine system, such as the system of FIG. 1. A first oxygen sensor may be positioned at an outlet of the CAC. In one example, the oxygen sensor may be a variable voltage intake oxygen sensor which may operate in a variable voltage (VVs) mode or a base mode. A method for operating the first oxygen sensor to determine water storage at the CAC is shown in FIG. 2. Specifically, a water release amount, or amount of water in the charge air at the CAC outlet, may be determined with the first oxygen sensor. In some example, a second oxygen sensor may be positioned at an inlet of the CAC. FIG. 3 shows a method for operating the first oxygen sensor and the second oxygen sensor to determine water storage parameters at the CAC. The water storage parameters may include a water storage rate, a water release rate, a water storage amount (e.g., amount of water or condensate within the CAC), and/or a water release amount. An engine controller may then adjust engine operation based on the water storage parameters, as shown at FIG. 4. Adjusting engine operation may include adjusting engine actuators to decrease a cooling efficiency of the CAC, purge condensate from the CAC, and/or increase combustion stability during ingestion of water by the engine. Additionally, as shown at FIGS. 5-6, the engine controller may diagnose oxygen sensor function by comparing the measurements and/or outputs of the first oxygen sensor and the second oxygen sensor under certain engine operating conditions. For example, under engine operating conditions when no difference in the concentration of oxygen is expected between the charge air entering and exiting the CAC, the controller may compare the oxygen sensor readings. If the difference in the sensor outputs is greater than a threshold, one or more of the sensors may be degraded. In this way, positioning a first oxygen sensor at the outlet of the CAC and/or a second oxygen sensor at the inlet of the CAC may allow for the determination of condensate storage parameters of the CAC. Engine actuator adjustments based on these determined condensate storage parameters may then decrease condensate formation in the CAC, increase combustion stability during condensate purging from the CAC, and/or decrease water storage within the CAC.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle via an intermediate transmission system 150. Further, a starter motor may be coupled to crankshaft 40 via a flywheel to enable a starting operation of engine 10. The crankshaft 40 may also be used to drive an alternator (not shown in FIG. 1).

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. As elaborated herein, a controller may vary the transmission gear (e.g., upshift or downshift the transmission gear) to adjust an amount of torque conveyed across the transmission and torque converter to vehicle wheels 156 (that is, an engine shaft output torque).

As the transmission shifts to a lower gear, the engine speed (Ne or RPM) increases, increasing engine airflow. An intake manifold vacuum generated by the spinning engine may be increased at the higher RPM. In some examples, as discussed further below, downshifting may be used to increase engine airflow and purge condensate built up in a charge air cooler (CAC) 80.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in. In an alternate embodiment, compression ignition may be used to ignite the injected fuel.

The intake manifold 44 may receive intake air from an intake passage 42. The intake passage 42 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42, such as a throttle upstream of a compressor 60 (not shown).

Further, in the disclosed embodiments, an exhaust gas recirculation (EGR) system may route a desired portion of exhaust gas from the exhaust passage 48 to the intake passage 42 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger through EGR passage 140. FIG. 1 also shows a low pressure EGR system where EGR is routed from downstream of turbine of a turbocharger to upstream of a compressor of a turbocharger through low pressure EGR passage 157. A low pressure EGR valve 155 may control the amount of EGR provided to the intake passage 42. In some embodiments, the engine may include both a high pressure EGR and a low pressure EGR system, as shown in FIG. 1. In other embodiments, the engine may include either a low pressure EGR system or a high pressure EGR system. When operable, the EGR system may induce the formation of condensate from the compressed air, particularly when the compressed air is cooled by the charge air cooler, as described in more detail below.

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIG. 1, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 60. The wastegate 26 and/or the CRV 27 may be controlled by the controller 12 to be opened when a lower boost pressure is desired, for example. For example, in response to compressor surge or a potential compressor surge event, the controller 12 may open the CBV 27 to decrease pressure at the outlet of the compressor 60. This may reduce or stop compressor surge.

The intake passage 42 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. When the charge air includes recirculated exhaust gasses, the condensate can become acidic and corrode the CAC housing. The corrosion can lead to leaks between the air charge, the atmosphere, and possibly the coolant in the case of water-to-air coolers. Further, if condensate builds up in the CAC, it may be ingested by the engine during times of increased airflow. As a result, unstable combustion and/or engine misfire may occur.

The engine 10 may further include one or more oxygen sensors positioned in the intake passage 42. As such, the one or more oxygen sensors may be referred to as intake oxygen sensors. In the depicted embodiment, a first oxygen sensor 162 is positioned downstream of the CAC 80. In one example, the first oxygen sensor 162 may be positioned at an outlet of the CAC 80. As such, the first oxygen sensor 162 may be referred to herein as the CAC outlet oxygen sensor. In another example, the first oxygen sensor 162 may be positioned downstream of the CAC 80 outlet. FIG. 1 also shows a second oxygen sensor 160 positioned upstream of the CAC 80. In one example, the second oxygen sensor 160 may be positioned at an inlet of the CAC 80. As such, the second oxygen sensor 160 may be referred to herein as the CAC inlet oxygen sensor. In another example, the second oxygen sensor 160 may be positioned upstream of the CAC inlet and downstream of the compressor 60.

In some embodiments, the engine 10 may include both the first oxygen sensor 162 and the second oxygen sensor 160. In other embodiments, the engine 10 may include only one of the first oxygen sensor 162 and the second oxygen sensor 160. For example, the engine 10 may only include the first oxygen sensor 162 downstream of the CAC 80. In some embodiments, as shown in FIG. 1, an optional third oxygen sensor 164 may be positioned in the intake passage 42. The third oxygen sensor 164 may be positioned downstream of the compressor 60 and the EGR passage 140 (or EGR passage 157 if the engine only includes low pressure EGR).

Intake oxygen sensors 160, 162, and/or 164 may be any suitable sensor for providing an indication of the oxygen concentration of the charge air (e.g., air flowing through the intake passage 42), such as a linear oxygen sensor, intake UEGO (universal or wide-range exhaust gas oxygen) sensor, two-state oxygen sensor, etc. In one example, the intake oxygen sensors 160, 162, and/or 164 may be an intake oxygen sensor including a heated element as the measuring element. During operation, a pumping current of the intake oxygen sensor may be indicative of an amount of oxygen in the gas flow.

In another example, the intake oxygen sensor 160, 162, and/or 164 may be a variable voltage (variable Vs or VVs) intake oxygen sensor wherein a reference voltage of the sensor may be modulated between a lower or base voltage at which oxygen is detected and a higher voltage at which water molecules in the gas flow may be dissociated. For example, during base operation, the intake oxygen sensor may operate at the base reference voltage. At the base reference voltage, when water hits the sensor, the heated element of the sensor may evaporate the water and measure it as a local vapor or diluent. This operational mode may be referred to herein as the base mode. The intake oxygen sensor may also operate in a second mode wherein the reference voltage is increased to a second reference voltage. The second reference voltage may be higher than the base reference voltage. Operating the intake oxygen sensor at the second reference voltage may be referred to herein as variable Vs (VVs) mode. When the intake oxygen sensor operates in VVs mode, the heated element of the sensor dissociates water in the air and subsequently measures the water concentration. In this mode, the pumping current of the sensor may be indicative of an amount of oxygen in the gas flow plus an amount of oxygen from dissociated water molecules. However, if the reference voltage is further increased, additional molecules, such as $CO_2$, may also be dissociated and the oxygen from these molecules may also be measured by the sensor. In a non-limiting example, the lower, base reference voltage may be 450 mV and the higher, second reference voltage may be greater than 950 mV. However, in the methods presented at FIGS. 2-3 for determining an amount of water in the charge air, the second reference voltage may be maintained lower than a voltage at which $CO_2$ may also be dissociated. In this way, the second reference voltage may be set such that only oxygen from water (and not $CO_2$) may be measured in VVs mode.

The first oxygen sensor 162 and/or the second oxygen sensor 160 may be used to estimate condensate or water storage at the CAC 80 and/or water release from the CAC 80. As discussed further below with reference to FIGS. 2-3, the oxygen concentration in the air entering and/or leaving the CAC 80 (e.g., determined by second oxygen sensor 160 and first oxygen sensor 162, respectively) may be used to determine a concentration of water entering and/or leaving the CAC 80. Various methods may be used to estimate water in the charge air entering and/or leaving the CAC 80. For example, the intake oxygen sensor(s) may measure an amount of oxygen in the charge air and then estimate an amount of water in the charge air using a dilution method. If the intake oxygen sensor is a VVs intake oxygen sensor, the sensor may estimate an amount of water in the charge air using the dilution method and/or a dissociation method (e.g., operating in VVs mode). Both of these methods for measuring and/or estimating an amount of water in the charge air are discussed further below.

A first method for estimating water in the charge air using an intake oxygen sensor includes the dilution method. When using the dilution method, the intake oxygen sensor may be operated in the base mode at the base reference voltage. In one example, the base reference voltage may be 450 mV. In another example, the base reference voltage may be a voltage larger or smaller than 450 mV. The intake oxygen sensor may take a measurement and determine an amount of oxygen in the gas (e.g., intake or charge air) based on a pumping current of the sensor. Then, a comparison of the measured concentration of oxygen vs. the amount of air may be used to determine the amount of water as a diluent in the charge air. The dilution method may give an inaccurate water estimate if the diluent includes substances other than water, such as EGR and/or fuel vapor. Thus, estimating water in the charge air with the dilution method may only be used when EGR flow is below a threshold. In one example, the threshold may be substantially zero. In another example, the threshold may be some rate greater than zero.

A second method for estimating water in the charge air using an intake oxygen sensor includes the dissociation method. Specifically, for the dissociation method, a VVs intake oxygen sensor may operate in VVs mode wherein the reference voltage is increased from the base reference voltage to the higher, second reference voltage. In one example, the second reference voltage may be 950 mV. In another example, the second reference voltage may be a voltage greater than 950 mV. However, the second reference voltage may be maintained at a voltage lower than the voltage at which $CO_2$ is dissociated by the sensor. In VVs mode, the intake oxygen sensor dissociates the water into hydrogen and oxygen and measures the amount of oxygen from dissociated water molecules in addition to the amount of oxygen in the gas. By taking the difference between the measurements at the second reference voltage and the base reference voltage, an estimate of the total water concentration in the charge air may be determined. Additionally, at each temperature condition at the outlet of the CAC, a different amount of saturated water may be produced. If the saturation water at the CAC outlet temperature condition is known (e.g., in a look-up table stored in the controller), the controller 12 may subtract this value from the total water concentration measured by the intake oxygen sensor to determine an amount water in the charge air in the form of water droplets. For example, the saturation water at the CAC outlet temperature condition may include a mass of water at the saturation vapor pressure condition at the CAC outlet. In this way, the controller may determine an amount of liquid water in the charge air entering and/or exiting the CAC from intake oxygen sensor measurements.

The oxygen sensors may operate in either the base mode or the VVs mode based on engine operating conditions. For example, if the EGR rate is greater than a threshold rate, the oxygen sensors may operate in the VVs mode to determine the water amount or water concentration in the charge air. However, if the EGR rate is less than the threshold rate, the oxygen sensor may operate in either the VVs mode or the base mode to determine water amount or water concentration in the charge air. If operating in VVs mode is possible (e.g., the sensor is a VVs intake oxygen sensor), the controller 12 may use VVs mode measurements to increase the accuracy of water storage and/or water release amount estimates. However, in some embodiments, the controller may use measurements from both modes of operation in order to diagnose the sensors and/or determine EGR flow, as discussed further below.

The controller 12 may use measurements at one or both of the first oxygen sensor 162 and the second oxygen sensor 160 to determine one or more of a water storage rate in the CAC 80, a water release rate from the CAC 80, a water storage amount in the CAC 80 (e.g., amount of water in the CAC 80), and/or a water release amount from the CAC 80 (e.g., amount or volume of water leaving the CAC 80 and traveling to the intake manifold 44). For example, the water release amount from the CAC 80 may be estimated from measurements from the first oxygen sensor 162 positioned at the CAC outlet. The controller 12 may determine the water release amount by one or more of the methods described above (e.g., dilution or dissociation method). In another example, the water storage rate in the CAC 80 and/or the water release rate from the CAC 80 may be determined by comparing measurements of the first oxygen sensor 162 and the second oxygen sensor 160. Specifically, if the determined water concentration (or estimated amount of water) at the first oxygen sensor 162 is greater than the determined water concentration (or estimated amount of water) at the second oxygen sensor 160 water is leaving the CAC 80. Thus, the water release rate from the CAC 80 may be based on a difference between the water measurements at the first oxygen sensor 162 and the second oxygen sensor 160. Conversely, if the determined water concentration (or estimated water amount) at the second oxygen sensor 160 is greater than the determined water concentration (or estimated water amount) at the first oxygen sensor 162, water is being stored in the CAC 80. Thus, the water storage rate at the CAC 80 may be based on a difference between the water measurements at the second oxygen sensor 160 and the second oxygen sensor 162. Further, by integrating the water storage and/or water release rate, the controller 12 may estimate the amount of water being stored within the CAC 80 (e.g., water storage amount).

In response to these water storage estimates, the controller 12 may adjust engine actuators to adjust combustion parameters, activate condensate purging routines, and/or adjust actuators to increase or decrease CAC cooling efficiency. Engine actuator adjustments in response to water storage measurements from the oxygen sensors is presented in further detail below at FIG. 4.

The third oxygen sensor 164 may be used to determine EGR flow. For example, controller 12 may estimate the percent dilution of the EGR flow based on feedback from the third oxygen sensor 164. In some examples, the controller 12 may then adjust one or more of EGR valve 142, EGR valve 155, throttle 21, CRV 27, and/or wastegate 26 to achieve a desired EGR dilution percentage of the intake air. In other examples, EGR flow may be determined from one or both of the first oxygen sensor 162 and the second oxygen sensor 160.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include a temperature and/or pressure sensor 124 at an outlet of a charge air cooler 80, the first oxygen sensor 162, the second oxygen sensor 160, the third oxygen sensor 164, and a boost pressure sensor 126. Other sensors not depicted may also be present, such as a sensor for determining the intake air velocity at the inlet of the charge air cooler, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIGS. 2-6.

The system of FIG. 1 provides for an engine system including an intake manifold, a charge air cooler positioned upstream of the intake manifold, a first oxygen sensor positioned at an outlet of the charge air cooler, a second oxygen sensor positioned at an inlet of the charge air cooler, and a controller with computer readable instructions for adjusting engine operation responsive to water storage parameters at the charge air cooler, the water storage parameters based on an output of the first oxygen sensor and an output of the second oxygen sensor. In one example, adjusting engine operation includes one or more of adjusting spark timing, mass air flow, vehicle grille shutters, engine cooling fans, a charge air cooler coolant pump, and/or downshifting a transmission gear. Further, water storage parameters include one or more of a water release amount from the charge air cooler, a water release rate from the charge air cooler, a water storage amount in the charge air cooler, and a water storage rate in the charge air cooler. In an alternate embodiment, the engine system may not include the second oxygen sensor. In this embodiment, the controller may include computer readable instructions for adjusting engine actuators based on an amount of water in charge air exiting the charge air cooler, the amount of water based on an output of the first oxygen sensor.

FIG. 2 shows a method 200 for operating an oxygen sensor to determine water storage at the CAC. Specifically, the oxygen sensor may be an oxygen sensor positioned proximate to an outlet of the CAC. In one example, the method 200 is executable by the controller 12 shown in FIG. 1. The method 200 may be used in an engine system in which only an oxygen sensor at the outlet of the CAC (such as first oxygen sensor 162 shown in FIG. 1) is used to determine water storage parameters at the CAC. For example, the engine system may not have an oxygen sensor positioned at the inlet of the CAC (such as second oxygen sensor 160 shown in FIG. 1).

The method begins at 202 by estimating and/or measuring engine operating conditions. Engine operating conditions may include engine speed and load, EGR flow rate, mass air flow rate, conditions of the charge air cooler (e.g., inlet and/or outlet temperature and pressures), humidity, ambient temperature, torque demand, etc. At 204, the method includes determining if EGR flow is less than a threshold. The threshold may include a threshold amount of EGR or a threshold EGR flow rate. The threshold flow may be based on a maximum EGR flow rate for which water is the major diluent in the charge air (e.g., diluent in the charge air is mostly water and EGR as a diluent may be negligible). In this way, the threshold may be based on a maximum EGR flow rate for which oxygen sensor dilution measurements give an accurate water estimate. For example, as described above, the dilution method may give an inaccurate water estimate for the diluent in the charge air if EGR is present as an additional diluent. Thus, in one example, the threshold EGR flow rate may be substantially zero. In another example, the threshold may be a rate or amount of EGR flow greater than zero, but small enough such that the oxygen sensor gives an accurate water estimate within a certain accuracy percentage.

At 204, if the EGR flow is not less than the threshold, the method continues on to 206 to operate the oxygen sensor in the VVs mode. The method at 206 may include increasing the reference voltage of the oxygen sensor from a base, first voltage to a second voltage. The method may further include determining a change in pumping current between the base reference voltage and the second reference voltage. As described above, the change in pumping current may be indicative of the amount of oxygen in the gas and the amount of oxygen dissociated from water molecules in the gas (e.g., charge air). From 206, the method proceeds to 208 to determine a total water (e.g., condensate) concentration in the charge air (e.g., in the charge air at the CAC outlet) based on the change in pumping current. Then, at 210, the method includes determining an amount of liquid water (e.g., water droplets) in the charge air at the CAC outlet (e.g., exiting the CAC). This water amount may be a water release amount from the CAC. The method at 210 may include subtracting a saturation water value for the CAC outlet temperature from the total water concentration. The saturation water values may include a mass of water at the saturation vapor pressure condition at the CAC outlet. As discussed above, the controller may determine the saturation water value from a look-up table of saturation water values at various CAC outlet temperatures stored in the controller. At 212, the controller may adjust engine actuators based on the water release amount determined at 210. A method for adjusting engine actuators responsive to the water release amount is presented at FIG. 4.

Returning to 204, if the EGR flow is less than the threshold, the method continues on to 214 to operate the oxygen sensor in either the base mode or the VVs mode and then estimate an amount of water in the charge air leaving the CAC (e.g., water release amount). In one example, if the oxygen sensor is not a VVs sensor, the oxygen sensor may operate at the base or pre-set reference voltage and estimate the water release amount with the dilution method. As discussed above, the dilution method may include measuring the amount of oxygen in the charge air exiting the CAC outlet. Assuming the diluent in the charge air is water, the controller may determine the amount of water in the charge air based on the concentration of oxygen in air vs. the concentration of oxygen measured in the charge air. Since the oxygen sensor may be positioned at the CAC outlet, the amount of water in the charge air may be an estimate of the water release amount from the CAC.

In an alternate example, if the oxygen sensor is a VVs sensor, the oxygen sensor may operate in either the base mode or the VVs mode and determine the water release amount by either the dilution method or the dissociation method, respectively. The mode of operation may be based on. In one example, the controller may operate the VVs oxygen sensor in VVs mode to increase the accuracy of the water estimation. Operating the oxygen sensor in VVs mode includes increasing the reference voltage of the oxygen sensor to the second reference voltage and then determining the water release amount using the dissociation method. This method at 214 may include the same steps as discussed above at 206-210. In another example, the controller may operate the VVs oxygen sensor in the base mode when less accurate water measurements are acceptable. For example, if condensate forming conditions such as high humidity and low ambient temperature are not present, the oxygen sensor may operate in the base mode. After determining the water release amount, the method continues on to 212 to adjust engine actuators based on the water release amount. The method for adjusting engine actuators based on the water release amount is presented at FIG. 4, discussed further below.

FIG. 3 shows a method 300 for operating oxygen sensors to determine water storage at the CAC. Specifically, the oxygen sensors may be a first oxygen sensor positioned proximate to an outlet of the CAC (e.g., outlet oxygen sensor) and a second oxygen sensor positioned proximate to an inlet of the CAC (e.g., inlet oxygen sensor). In one example, the method 300 is executable by the controller 12 shown in FIG. 1. The method 300 may be used in an engine system in which the first oxygen sensor at the outlet of the CAC (such as first oxygen sensor 162 shown in FIG. 1) and/or the second oxygen sensor at the inlet of the CAC (such as second oxygen sensor 160 shown in FIG. 1) are used to determine water storage parameters at the CAC.

The method begins at 302 by estimating and/or measuring engine operating conditions. Engine operating conditions may include engine speed and load, EGR flow rate, mass air flow rate, conditions of the charge air cooler (e.g., inlet and/or outlet temperature and pressures), humidity, ambient temperature, torque demand, etc. At 304, the method includes determining if EGR flow is less than a threshold. The threshold may include a threshold amount of EGR or a threshold EGR flow rate. The threshold may be based on a maximum EGR flow rate for which oxygen sensor dilution measurements give an accurate water estimate. For example, as described above, the dilution method may give an inaccurate water estimate for the diluent in the charge air if EGR is present as an additional diluent. Thus, in one example, the threshold EGR flow rate may be substantially zero. In another example, the threshold may be a rate or amount of EGR flow greater than zero, but small enough such that the oxygen sensor gives an accurate water estimate within a certain accuracy percentage.

At 304, if the EGR flow is at or greater than the threshold, the method continues on to 306 to operate both the CAC inlet and the outlet oxygen sensors in the VVs mode to measure oxygen in the charge air. The method at 306 further includes estimating the water release amount from the CAC based on the output of the oxygen sensor positioned at the CAC outlet (e.g., outlet oxygen sensor). Operating the oxygen sensors in VVs mode and estimating the water release amount from the outlet oxygen sensor may follow the same procedure as outlined above at steps 206-210 in method 200 of FIG. 2. As described above, the water release amount may be based on a change in pumping current, as well as a saturation water value at the CAC outlet temperature condition. The CAC outlet temperature condition may be determined from a temperature sensor positioned at the outlet of the CAC (such as sensor 124 shown in FIG. 1).

After taking measurements in VVs mode at 306, the method continues on to 308. At 308, the controller may compare the outputs or measurements of the inlet oxygen sensor and the outlet oxygen sensor to determine a water release or water storage rate. In one example, comparing the sensor outputs may include taking the difference between the water estimates. The water estimates may include an amount of liquid water in the charge air, as described above. In another example, the water estimates may include a total amount of water in the charge air (e.g., total water concentration). In this example, the saturation water value at the CAC outlet temperature may not be subtracted from this amount, as shown at 210 in FIG. 2. In yet another example, the water estimates may include water estimates based on the pumping current at the higher, second reference voltage along (and not the change in pumping current when increasing the reference voltage). The same water estimates for the inlet and outlet oxygen sensors may be used when taking the difference between the water estimates. For example, the controller may subtract the water estimate of the outlet oxygen sensor from the water estimate of the inlet oxygen sensor, the water estimates being the same type of water estimates. If the difference in the water estimates is positive, water may be being stored within the CAC and the difference in the water estimates is a water storage rate of the CAC. Alternatively, if the difference in the water estimates is negative, water may be being released from the CAC and the difference in the water estimates is a water release rate from the CAC.

After determining the water release rate or water storages rate, the method continues on to 310 to determine a water storage amount. In one example, the method at 310 may include integrating the water release and/or water storage rate to determine the water storage amount. The water storage amount may be an amount of water or condensate stored within the CAC. The water storage amount may increase as condensate-forming conditions increase. Condensate forming conditions may include increasing ambient humidity and/or decreasing ambient temperature.

At 312, the controller may adjust engine actuators based on the determined water release amount, water storage amount, water release rate, and/or water storage rate. In one example, the controller may adjust engine actuators to decrease a cooling efficiency of the CAC as the water storage amount increases. In another example, the controller may adjust engine actuators to purge condensate from the CAC as water storage increases. In yet another example, the controller may adjust engine actuators to increase combustion stability as the water release rate and/or water release amount increases. A method for adjusting engine actuators based on the water release amount, water storage amount, water release rate, and/or water storage rate at the CAC is presented at FIG. 4, described further below.

Returning to 304, if the EGR flow is instead less than the threshold, the method continues on to 314. At 314, the method includes operating both the inlet and outlet oxygen sensors at the base, first voltage (e.g., operate in base mode) and measuring the oxygen concentration of the charge air. As described above, the controller may use the dilution method to estimate the amount of water as the diluent in the charge air at the inlet and outlet of the CAC from the oxygen concentration measurements from the inlet oxygen sensor and the outlet oxygen sensor, respectively.

At 316, the method includes increasing the reference voltage of the inlet and outlet oxygen sensors from the base, first voltage to the second voltage. Thus, the method at 316 includes operating the inlet and outlet oxygen sensors in the VVs mode. Operating the oxygen sensors in the VVs mode and measuring the oxygen concentration in the charge air at 316 follows the same procedure described at 306 and at 206-210 of method 200 presented at FIG. 2.

At 318, the controller estimates the water release amount from the CAC (e.g., amount of water in the charge air exiting the CAC). The controller may determine the water release amount based on the CAC outlet oxygen sensor measurement in either the base or the VVs mode. As described above with regard to FIG. 2, which sensor measurement to use (e.g., base mode measurement or VVs mode measurement) may be based on a desired accuracy level and/or additional engine operating conditions.

From 318, the method continues on to 308 to compare the measurements and corresponding water estimates from the inlet oxygen sensor and the outlet oxygen sensor, as described above. In addition to the examples described above, the water estimates may include water dilution estimates from the inlet oxygen sensor and the outlet oxygen sensor. The controller may determine the water release rate and/or the water storage rate from a difference between water concentration, or other water estimates, determined from the inlet oxygen sensor and the outlet oxygen sensor. After determining the water release rate and/or water storage rate at the CAC, the method then continues on to 310 to determine the water storage amount and finally to 312 to adjust engine actuators based on the determine water storage parameters of the CAC. As described above, water storage parameters of the CAC may include one or more of the water release amount, the water storage amount, the water release rate, and/or the water storage rate. Further details on engine actuator adjustments in response to these parameters are discussed below with regard to FIG. 4.

Turning now to FIG. 4, a method 400 is shown for adjusting engine actuators and/or engine operation based on water storage in the CAC. In one example, the method 400 is executable by the controller 12 shown in FIG. 1. Method 400 begins at 402 by obtaining oxygen sensor data from one or more oxygen sensors. The one or more oxygen sensors may include an oxygen sensor proximate to the inlet of the CAC (e.g., second oxygen sensor 160 shown in FIG. 1) and/or an oxygen sensor positioned proximate to the outlet of the CAC (e.g., first oxygen sensor 162 shown in FIG. 1). For example, the method at 402 may include obtaining CAC water storage data or parameters determined in method 200 or method 300, presented at FIG. 2 and FIG. 3, respectively. The water storage parameters may include one or more of a water storage rate (e.g., rate of water accumulating within the CAC), a water storage amount (e.g., amount of water stored in the CAC), a water release rate (e.g., rate of water exiting the CAC in the charge air stream), and/or a water release amount (e.g., amount of water in the charge air exiting the CAC).

At 404, the method includes determining if the water storage rate (e.g., condensate storage rate) is greater than a threshold rate. In one example, the threshold water storage rate may be based on a rate at which a threshold amount of condensate may accumulate in the CAC. The threshold amount of condensate (or water) may result in engine misfire or unstable combustion if blown out of the CAC at once and ingested by the engine. If the water storage rate is greater than the threshold rate, the method continues on to 406 to decrease cooling efficiency of the CAC. Decreasing cooling efficiency of the CAC may include one or more of closing or reducing an opening of vehicle grille shutters, turning off or reducing a speed of an engine cooling fan or dedicated CAC fan, and/or decreasing coolant pump speed of a coolant-cooled CAC. Other engine actuator adjustments may also be made to decrease the cooling efficiency of the CAC, thereby reducing condensate formation. In one example, the controller may adjust the above engine actuators (e.g., fan, grille shutters, etc.) to increase the CAC temperature above a dew point temperature.

After decreasing CAC cooling efficiency, the method continues on to 408 to determine if a water storage amount at the CAC is greater than a threshold amount. As discussed above, the water storage amount may be an amount of condensate or water stored or built-up within the CAC. In one example, the threshold water storage amount may be based on an amount of water that may result in engine misfire and/or unstable combustion if blown out of the CAC and ingested by the engine all at once. If the water storage amount at the CAC is greater than the threshold amount, the method continues on to 410 to purge accumulated condensate from the CAC. At 410, the controller may activate various condensate purging routines to evacuate condensate from the CAC, based on engine operating conditions. For example, during a tip-in or other increase in engine airflow, the controller may limit an increase in engine airflow to controllably release condensate from the CAC and into the intake manifold of the engine. In another example, the controller may increase engine airflow, even if there is not an increased torque request, to purge condensate from the CAC. In one example, the controller may increase engine airflow by downshifting at transmission gear. In another example, increasing engine airflow may include increasing an opening of a throttle to increase mass air flow. The method at 410 may also include adjusting additional engine actuators such as spark timing, air-fuel ratio, etc. during the various condensate purging routines. Alternatively, if the water storage amount is not greater than the threshold amount at 408, the method may continue on to 412 to maintain engine airflow at a requested level and maintain engine operating conditions.

Returning to 404, if the water storage rate is not greater than the threshold rate, the method continues on to 414 to determine if the water release rate is greater than threshold rate and/or if the water release amount from the CAC is greater than a threshold amount. The threshold water release rate and/or the threshold amount of water release may be based on an amount of water that may cause unstable combustion and/or engine misfire when ingested by the engine. If either of the conditions at 414 is met, the method continues on to 416 to adjust combustion parameters and/or limit airflow to the engine. In one example, adjusting combustion parameters may include adjusting spark timing to increase combustion stability during the water ingestion (e.g., water release from CAC). For example, the controller may advance spark timing during a tip-in when the water release rate and/or water release amount are greater than their respective thresholds. In another example, the controller may retard spark timing if the pedal position is relatively constant, or below a threshold position, when the water release rate and/or water release amount are greater than their respective thresholds (e.g., during a condensate purging routine). The amount of spark retard or advance may be based on the water release rate and/or the water release amount. In other examples, additional or alternative combustion parameters may be adjusted during the water release conditions.

If the water release rate and the water release amount are not greater than their respective thresholds at 414, the method continues on to 412 to maintain engine operating conditions. In alternate embodiments, the method after 414 may also include determining if the water storage amount in the CAC is greater than the threshold amount (as shown at 408). In this embodiment, the method may continue directly from 414 to 408 and then continue on as described above.

In this way, the controller may adjust engine actuators to reduce condensate formation at the CAC and/or increase combustion stability during water release from the CAC. The controller may base the engine actuator adjustments on water storage and/or water release (e.g., amount of water in the charge air exiting the CAC) parameters. Further, the controller may determine the CAC water storage and/or water release parameters based on output from one or more oxygen sensors positioned around the CAC (e.g., at the inlet and/or outlet of the CAC).

In addition to controlling CAC cooling efficiency and/or combustion parameters, outputs from the inlet and outlet CAC oxygen sensors may be used for various diagnostics. In one example, the controller may use oxygen sensor output to diagnose alternate models and/or estimates of CAC efficiency, CAC condensate, and/or CAC dew point. For example, a water storage rate (or amount) determined from the inlet and outlet CAC oxygen sensors may be compared to an expected water storage rate determined from one of the CAC condensate models. If the two water storage rate estimates are not within a threshold of one another, the controller may indicate an error in the condensate model. The controller may then make adjustments to the model to increase the accuracy. A description of example CAC condensate estimates and/or models are described below with regard to FIGS. 5-6.

In another example, the controller may diagnose oxygen sensor function by comparing the measurements and/or outputs of the CAC inlet and outlet oxygen sensors under certain operating conditions. For example, under engine operating conditions when no difference in the concentration of oxygen is expected between the charge air entering and exiting the CAC, the controller may compare the oxygen sensor readings. If there is a difference in the oxygen concentration measurements between the inlet oxygen sensor and the outlet oxygen sensor, the controller may determine that one or both of the sensors is degraded. The engine operating conditions for diagnosing the inlet and outlet oxygen sensors may include one or more of no EGR flow (or EGR flow rate below a threshold) and no net change in condensation at the CAC. For example, no net change in condensation at the CAC may include no condensate forming in or leaving the CAC (e.g., a water storage rate and water release rate of substantially zero).

FIG. 5 shows a method 500 for indicating degradation of a first oxygen sensor positioned at an outlet of a CAC and a second oxygen sensor positioned at an inlet of the CAC based on engine operating conditions. In alternate embodiments, the first oxygen sensor may be positioned downstream of the CAC and upstream of combustion chambers of the engine and the second oxygen sensor may be positioned upstream of the CAC and downstream of a compressor. In one example, the method 500 is executable by the controller 12 shown in FIG. 1. Further, the first oxygen sensor may be referred to as the outlet oxygen sensor and the second oxygen sensor may be referred to as the inlet oxygen sensor.

The method begins at 502 by estimating and/or measuring engine operating conditions. Engine operating conditions may include engine speed and load, EGR flow rate, mass air flow rate, conditions of the charge air cooler (e.g., inlet and/or outlet temperatures and pressures), humidity, ambient temperature, torque demand, etc. At 504, the method includes determining the level or amount of condensate in the CAC. This may include retrieving details such as ambient air temperature, ambient air humidity, inlet and outlet charge air temperature, inlet and outlet charge air pressure, and air mass flow rate from a plurality of sensors and determining the amount of condensate formed in the CAC based on the retrieved data. In one example, at 506, and as further elaborated at the model of FIG. 6, the rate of condensate formation within the CAC may be based on ambient temperature, CAC outlet temperature, mass flow, EGR, and humidity. In another example, at 508, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

At 510, the method includes determining if no condensate is forming in the CAC and no condensate is leaving the CAC. In an alternate example, the method at 510 may include determining if condensate below a threshold is forming in the CAC and if condensate below the threshold is leaving the CAC. In one example, the threshold may be substantially zero such that no condensate is forming in and leaving the CAC. In another example, the threshold may be a condensate level or rate greater than zero. Thus, in one example, the method at 510 may include determining if the amount and/or rate of condensate formation, as determined at 504, are substantially zero. In another example, the method at 510 may include determining if the amount and/or rate of condensate formation are less than a threshold. As discussed above, the threshold may indicate no net condensate formation at the CAC. The method at 510 may also include determining if the condensate release rate (e.g., water release rate) and/or condensate release amount (e.g., water release amount) are less than a threshold. The condensate release rate and/or release amount may be based on one or more of the determined level of condensate in the CAC, mass air flow, humidity, CAC temperature, etc. For example, if the condensate level in the CAC is below a threshold and/or the mass air flow is below a flow threshold for purging condensate, the controller may infer the condensate release rate to be substantially zero.

If the controller determines that condensate is forming in the CAC and/or condensate is leaving the CAC, the method continues on to 512 to not diagnose the oxygen sensors. The method may return to the beginning of the method and wait until the conditions at 510 are fulfilled. Alternatively, if the controller determines that no condensate is forming in the CAC and no condensate is leaving (e.g., being purged from) the CAC, the method continues on to 514. At 514, the method includes determining if the EGR flow rate is less than a threshold. In one example, the threshold EGR flow rate may be substantially zero. As such, oxygen sensor diagnosis may only proceed if there is no EGR. In another example, the threshold EGR flow rate may be a rate greater than zero but small enough such that the EGR flow may not cause a difference in the oxygen sensor output (e.g., oxygen concentration) between the inlet oxygen sensor and the outlet oxygen sensor. If EGR is not below the threshold at 514, the method continues on to 512 to not diagnose the oxygen sensors. The method may then return to the beginning.

However, if the EGR is below the threshold at 514, the method continues on to 516 to acquire oxygen sensor outputs at the CAC outlet oxygen sensor (OS) and inlet oxygen sensor (IS). Oxygen sensor output data may include one or more of an oxygen concentration obtained via the dissociation method when the oxygen sensors are operating in VVs mode and/or an oxygen concentration obtained via the dilution method when the oxygen sensors are operating in the base mode, as described above. Both the inlet oxygen sensor and the outlet oxygen sensor may be operated in the same mode when obtaining sensor data for oxygen sensor diagnosis at 516.

At 518, the method includes determining if the concentration of oxygen estimated at the outlet oxygen sensor is within a threshold of the concentration of oxygen estimated at the inlet oxygen sensor. In alternate embodiments, a different type of oxygen sensor output other than oxygen concentration (e.g., pumping current) may be compared at 518. The threshold may be pre-set and be based on a desired percentage accuracy or accuracy tolerance of the sensors. If both sensor readings are within the threshold of one another, the method continues on to 520 to determine the oxygen sensors are not degraded. Oxygen sensor operation for determining condensate storage parameters and adjusting engine actuators in response to condensate storage parameters may then continue as discussed above.

Alternatively at 518, if the concentration of oxygen measured by the outlet oxygen sensor and the concentration of oxygen measured by the inlet oxygen sensor are not within a threshold of one another, the method continues on to 522. At 522, the controller may indicate a possible degradation of oxygen sensor function. The method at 522 may include zeroing and/or resetting both the inlet and outlet oxygen sensor and then re-measuring the oxygen in the charge air at the inlet and outlet of the CAC. At 524, the controller determines if the new oxygen concentration estimate at the outlet oxygen sensor is within a threshold of the new oxygen concentration estimate at the inlet oxygen sensor. In one example, the threshold at 524 and the threshold at 518 may be the same. In another example, the threshold at 524 may be smaller or larger than the threshold at 518. If the new oxygen concentration measurements at the inlet and outlet oxygen sensors are within the threshold of one another, the method continues on to 520 to determine that the sensors are not degraded and continue oxygen sensor operation. However, if the oxygen concentration determined at the outlet oxygen sensor is not within the threshold of the oxygen concentration determined at the inlet oxygen sensor, the controller may determine that one or more of the inlet oxygen sensor and the outlet oxygen sensor are degraded at 526. In one example, at 526 the controller may notify the vehicle operator that maintenance of the oxygen sensors is required.

In some embodiments, method 500 may include a step before 502 determining if it is time to perform sensor diagnostics. In one example, the sensor diagnostics (e.g., method 500) may be executed by the controller after a duration of engine operation since the last sensor diagnostic. The duration may be a pre-set value. Alternatively, sensor diagnostics may be performed ever time sensor diagnostic conditions are met. As described above at 510 and 514, sensor diagnostic conditions may include no condensate forming in or leaving the CAC, and an EGR flow rate below a threshold.

In this way, during engine operation when condensate less than a threshold is forming in a charge air cooler and condensate less than the threshold is leaving the charge air cooler, an engine method may include indicating degradation of a first oxygen sensor positioned downstream of the charge air cooler and a second oxygen sensor positioned upstream of the charge air cooler with respect to one another. For example, if the sensors disagree with one another by greater than a maximum threshold, one and/or both of the sensors may be determined to be degraded, and an indication thereof may be generated, such as through a diagnostic code stored in memory of the controller. In one example, condensate less than the threshold forming in the charge air cooler is determined based on an estimate of an amount of condensate in the charge air cooler, the estimate based on each of mass air flow, ambient temperature, charge air cooler outlet temperature, charge air cooler pressure, ambient pressure, an exhaust gas recirculation amount, and humidity. In another example, condensate less than the threshold forming in the charge air cooler is determined based on an estimate of an amount of condensate in the charge air cooler, the estimate based on charge air cooler outlet temperature and a ratio of charge air cooler pressure to ambient pressure. Further, condensate less than the threshold leaving the charge air cooler is based on one or more of an estimated amount of condensate in the charge air cooler, mass air flow, humidity, and/or charge air cooler temperature.

The method may further include indicating degradation (e.g., diagnosing output) of the first oxygen sensor and the second oxygen sensor when an exhaust gas recirculation flow is less than a threshold, the threshold being substantially zero. Degradation of one or more of the first oxygen sensor and the second oxygen sensor may be indicated in response to the output of the first oxygen sensor not being within a threshold of the output of the second oxygen sensor. In one example, indicating degradation includes notifying a vehicle operation that one or more oxygen sensors are degraded. Additionally, before indicating degradation, the method may include zeroing the first oxygen sensor and the second oxygen sensor and then re-comparing outputs of the first oxygen sensor and the second oxygen sensor in response to the output of the first oxygen sensor not being within a threshold of the output of the second oxygen sensor.

In one example, the output of the first oxygen sensor and the output of the second oxygen sensor include an oxygen concentration of charge air.

FIG. 6 illustrates a method 600 for estimating the amount of condensate stored within a CAC. Based on the amount or rate of condensate formation in the CAC, oxygen sensor diagnostics, such as those discussed at FIG. 5, may be executed.

The method begins at 602 by determining the engine operating conditions. These may include, as elaborated previously at 502, ambient conditions, CAC conditions (inlet and outlet temperatures and pressures, flow rate through the CAC, etc.), mass air flow, MAP, EGR flow, engine speed and load, engine temperature, boost, etc. Next, at 604, the routine determines if the ambient humidity is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set to 100% at 606. However, if the humidity is known, the known humidity value, as provided by the humidity sensor, may be used as the humidity setting at 608.

The ambient temperature and humidity may be used to determine the dew point of the intake air, which may be further affected by the amount of EGR in the intake air (e.g., EGR may have a different humidity and temperature than the air from the atmosphere). The difference between the dew point and the CAC outlet temperature indicates whether condensation will form within the cooler, and the mass air flow may affect how much condensation actually accumulates within the cooler. At 610, an algorithm may calculate the saturation vapor pressure at the CAC outlet as a function of the CAC outlet temperature and pressure. The algorithm then calculates the mass of water at this saturation vapor pressure at 612. Finally, the condensation formation rate at the CAC outlet is determined at 614 by subtracting the mass of water at the saturation vapor pressure condition at the CAC outlet from the mass of water in the ambient air. By determining the amount of time between condensate measurements at 616, method 600 may determine the amount of condensate within the CAC since a last measurement at 618. The current condensate amount in the CAC is calculated at 622 by adding the condensate value estimated at 618 to the previous condensate value and then subtracting any condensate losses since the last routine (that is, an amount of condensate removed, for example, via purging routines) at 620. Condensate losses may be assumed to be zero if the CAC outlet temperature was above the dew point. Alternatively, at 620, the amount of condensate removed may be modeled or determined empirically as a function of air mass and integrated down with each software task loop (that is, with each run of routine 600).

As such, the method of FIG. 6 may be used by the controller during the routine of FIG. 5 to use a modeling method for estimating the amount of condensate at the CAC. In alternate embodiments, the engine control system may use a mapping method to map the amount of condensate at the CAC to a CAC inlet/outlet temperature, an ambient humidity, and an engine load. For example, the values may be mapped and stored in a look-up table that is retrieved by the controller during the routine of FIG. 5 (at 508), and updated thereafter.

Figure 7:
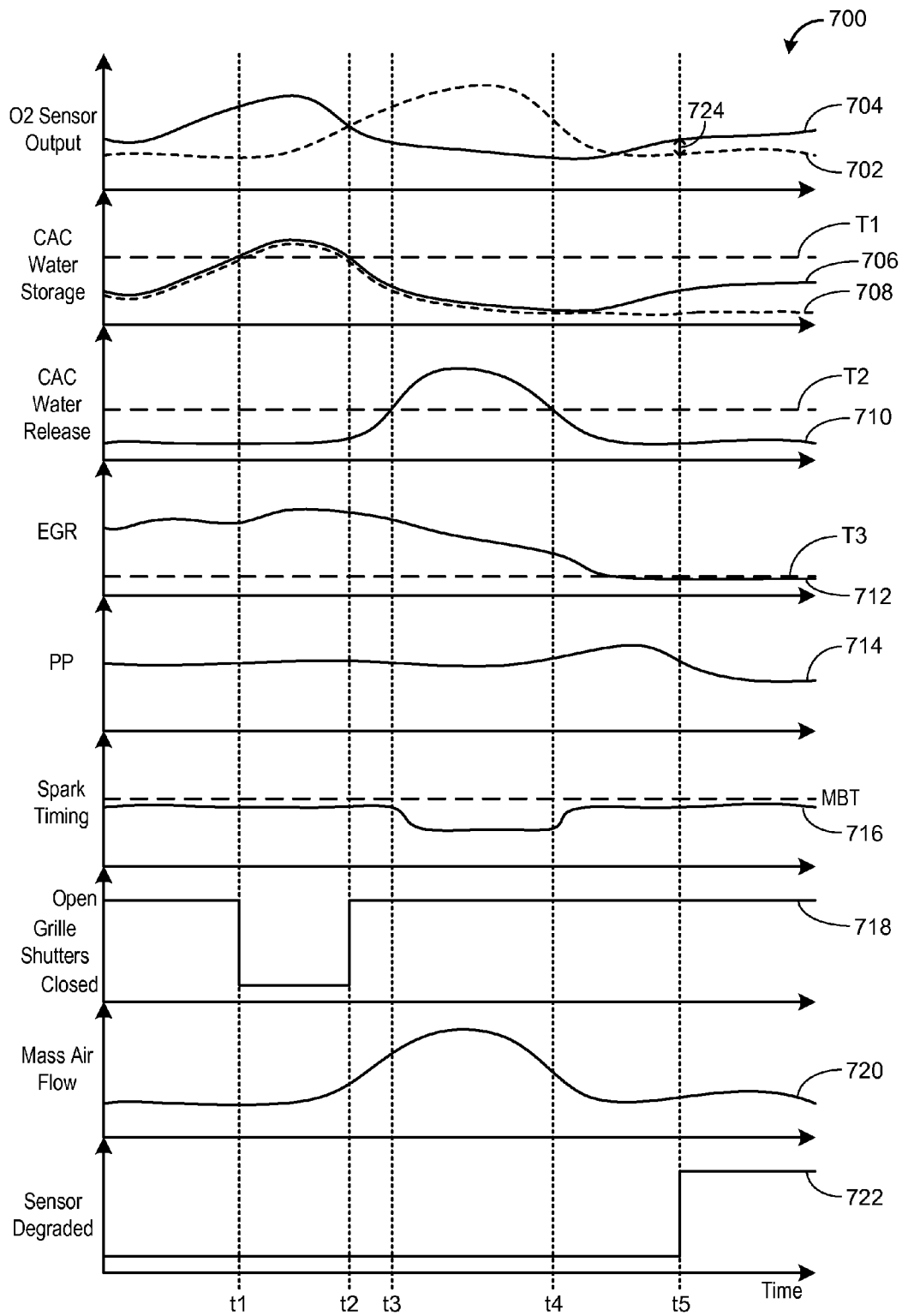
FIG. 7 shows a graph illustrating example adjustments to engine operation based on water storage at a charge air cooler.

FIG. 7 shows a graphical example of adjustments to engine operation based on water storage at the CAC. Specifically, graph 700 shows changes in an output of a first oxygen sensor at plot 702, changes in an output of a second oxygen sensor at plot 704, changes in CAC water storage based on the oxygen sensor outputs at plot 706, changes in CAC water storage based on one or more condensate models at plot 708, changes in EGR flow at plot 712, changes in pedal position (PP) at plot 714, changes in spark timing at plot 716, changes in a position of vehicle grille shutters at plot 718, changes is mass air flow at plot 720, and changes in sensor degradation at plot 722. The first oxygen sensor may be positioned at an outlet of the CAC and referred to herein as the outlet oxygen sensor. The second oxygen sensor may be positioned at an inlet of the CAC and referred to herein as the inlet oxygen sensor. In alternate embodiments, the CAC may only include one oxygen sensor at either the inlet or outlet of the CAC. For example, the CAC may only include the outlet oxygen sensor.

Plot 706 shows changes in water storage in the CAC, the water storage based on the outputs from the inlet oxygen sensor and the outlet oxygen sensor. The water storage shown at plot 706 may include an amount of water stored in the CAC or a rate of water storage in the CAC. Plot 708 also shows water storage data based on one or more condensate models. In one example, the water storage at plot 708 may include an amount or rate of water storage estimated from the condensate model shown at FIG. 6.

Prior to time t1, water storage in the CAC may be less than a threshold T1 (plot 706) and water release from the CAC may be less than a threshold T2 (plot 710). Additionally, the pedal position may be relatively constant (plot 714) and the grille shutters may be closed (plot 718). Before time t1, the inlet oxygen sensor output may be increasing. In one example, the inlet oxygen sensor output may be an oxygen concentration or estimated amount of oxygen in the charge air. This may indicate an increased amount of water in the charge air entering the CAC. As a result, the CAC water storage level may be increasing before time t1 (plot 706). At time t1, the CAC water storage level increases above the threshold T1 (plot 706). In response, the controller may close the grille shutters (plot 718) to reduce condensate formation in the CAC. In alternate examples, the controller may adjust alternate or additional engine actuators to reduce condensate formation. For example, the controller may additionally or alternatively turn off an engine cooling fan at time t1.

Between time t1 and time t1 the CAC water storage level may decrease. At time t2, the CAC water storage may decrease below the threshold T1 (plot 706). In response, the controller may re-open the grille shutters (plot 718). In alternate embodiments, the grille shutters may remain open at time t2. Also before time t2, mass air flow begins to increase. In one example, the controller may increase mass air flow based on engine operation. In another example, the controller may increase mass air flow to purge the stored condensate from the CAC. As the mass air flow increases, the outlet oxygen sensor output also increases. This increase in output may indicate an increase in water in the charge air exiting the CAC. As a result, water release from the CAC may be increasing between time t2 and time t3 (plot 710). At time t3, the CAC water release increases above threshold T2. In response, the controller retards spark timing from MBT (plot 716). The controller may retard spark timing rather than advancing spark timing since pedal position remains relatively constant at time t3. Retarding spark during the water release from the CAC may increase combustion stability as the engine ingests the released water (e.g., condensate). At time t4 the water release from the CAC decreases below the threshold T2 (plot 710). The controller then stops retarding spark (plot 716).

Between time t4 and time t5, EGR flow may decrease below a threshold T3. In one example, the threshold T3 may be substantially zero such that the EGR is turned off. In another example, the threshold T3 may be a flow rate greater than zero. Also between time t4 and time t5, the water storage in the CAC, based on the condensate model, may decrease below a threshold (plot 708). In one example, the threshold may be substantially zero. As a result, it may be inferred that no condensate is forming in the CAC. Based on engine operating conditions, the controller may also determine that no condensate is leaving the CAC (e.g., condensate less than a threshold is leaving the CAC). During engine operation wherein no condensate (or condensate less than a threshold) is forming in and leaving the CAC, the outlet oxygen sensor and the inlet oxygen sensor may have similar outputs. However, at time t5, the inlet oxygen sensor output and the outlet oxygen sensor output may deviate from one another by a threshold, the threshold indicated at 724. As a result, the controller may indicate sensor degradation, as shown at plot 722. Indicating sensor degradation may include indicating that one or more of the inlet oxygen sensor and the outlet oxygen sensor are degraded. In one example, the controller may notify the vehicle operator of sensor degradation at time t5.

In this way, outputs from one or more oxygen sensors positioned proximate to a CAC outlet and/or a CAC inlet may be used to determine water storage at the CAC. In one example, an oxygen sensor positioned at the outlet of the CAC may be used to determine the presence and/or an amount of water in the charge air exiting the CAC. In another example, a first oxygen sensor positioned at the outlet of the CAC and a second oxygen sensor positioned at the inlet of the CAC may be used to determine one or more of an amount of water leaving the CAC (e.g., water release amount), a rate of water leaving the CAC (e.g., water release rate), an amount of water within the CAC (e.g., water storage amount), and or a rate of water accumulation within the CAC (e.g., water storage rate). A controller may adjust one or more engine actuators in response to one or more of the above CAC water storage parameters. For example, the controller may adjust vehicle grille shutters, engine cooling fan, and/or an engine coolant pump to reduce CAC cooling efficiency in response to a water storage amount or rate above a threshold. In another example, the controller may adjust spark timing and/or engine airflow (or mass air flow) in response to the water release amount and/or water release rate increasing above a threshold. In yet another example, the controller may adjust engine airflow via adjusting a throttle and/or downshifting operations to purge condensate from the CAC in response to the water storage amount increasing above a threshold. In this way, a technical result of determining water storage parameters of the CAC from one or more oxygen sensors may be achieved, thereby reducing CAC condensate formation and increasing combustion stability.

As one embodiment, an engine method may include adjusting engine actuators based on an amount of water in charge air exiting a charge air cooler, the amount of water based on an output of an oxygen sensor positioned downstream of the charge air cooler. In one example, the oxygen sensor may be positioned at an outlet of the charge air cooler. In a first example, the oxygen sensor may be operated in a variable voltage mode responsive to an exhaust gas recirculation flow being at or greater than a threshold. The threshold may be based on a maximum exhaust gas recirculation flow rate for which water is a major diluent in the charge air. Operating the oxygen sensor in the variable voltage mode may include increasing a reference voltage of the oxygen sensor from a base, first voltage to a second voltage, the second voltage higher than the first voltage. Then, the amount of water may be estimated based on a difference in pumping current when increasing the reference voltage from the first voltage to the second voltage. The amount of water may be further based on a saturation water value at an outlet temperature condition of the charge air cooler. In a second example, the oxygen sensor may be operated in one or more of a base mode and a variable voltage mode responsive to an exhaust gas recirculation flow being less than a threshold.

Adjusting engine actuators may be based on the amount of water includes one or more of adjusting spark timing and/or limiting an increase in engine airflow in response to the amount of water in the charge air exiting the charge air cooler being greater than a threshold. In some embodiments, the amount of water in the charge air exiting the charge air cooler is further based on an output of an oxygen sensor positioned upstream of the charge air cooler. The method may then further comprise adjusting engine actuators based on charge air cooler water storage parameters, the water storage parameters including one or more of a water release amount from the charge air cooler, a water release rate from the charge air cooler, a water storage amount in the charge air cooler, and a water storage rate in the charge air cooler, the water storage parameters based on the output of the oxygen sensor positioned downstream of the charge air cooler and the output of the oxygen sensor positioned upstream of the charge air cooler.

As another embodiment, an engine method may include adjusting engine actuators based on water storage parameters at a charge air cooler, the water storage parameters based on an output of a first oxygen sensor positioned at an outlet of the charge air cooler. The water storage parameter includes an amount of water in charge air exiting the charge air cooler. Further, adjusting engine actuators includes one or more of adjusting spark timing and limiting engine airflow responsive to the amount of water in the charge air exiting the charge air cooler increasing above a threshold amount. The amount of water is estimated based on a pumping current of the first oxygen sensor and a saturation water value at an outlet temperature condition of the charge air cooler. In one example, adjusting spark timing includes advancing spark timing when a pedal position is increasing. In another example, adjusting spark timing includes retarding spark timing when the pedal position is below a threshold position.

The water storage parameters may further include a water release rate from the charge air cooler, a water storage rate at the charge air cooler, and a water storage amount at the charge air cooler. The water release rate, the water storage rate, and the water storage amount are based on the output of the first oxygen sensor and an output of a second oxygen sensor positioned at an inlet of the charge air cooler. In one example, adjusting engine actuators includes one or more of adjusting spark timing and mass air flow in response to the water release rate increasing above a threshold rate. In another example, adjusting engine actuators includes one or more of adjusting vehicle grille shutters, engine cooling fans, and a charge air cooler coolant pump to decrease a cooling efficiency of the charge air cooler in response to the water storage rate increasing above a threshold rate. In yet another example, adjusting engine actuators includes increasing engine airflow to purge condensate from the charge air cooler in response to the water storage amount increasing above a threshold amount.

As yet another embodiment, an engine method may include adjusting engine operation and generating diagnostics responsive to water storage parameters at a charge air cooler, the water storage parameters based on an output of a first oxygen sensor positioned downstream of the charge air cooler and an output of a second oxygen sensor positioned upstream of the charge air cooler. Specifically, the first oxygen sensor may be positioned at an outlet of the charge air cooler and the second oxygen sensor may be positioned at an inlet of the charge air cooler. The method may further include operating the first oxygen sensor and the second oxygen sensor in a variable voltage mode responsive to an exhaust gas recirculation flow being at or greater than a threshold, the threshold based on a maximum exhaust gas recirculation flow rate for which water is a major diluent in the charge air. Operating the first oxygen sensor and the second oxygen sensor in the variable voltage mode includes increasing a reference voltage of the first oxygen sensor and the second oxygen sensor from a base, first voltage to a second voltage, the second voltage higher than the first voltage. Further, the method may include operating the first oxygen sensor and the second oxygen sensor in one or more of a base mode and a variable voltage mode response to an exhaust gas reticulation flow being less than a threshold.

Water storage parameters at the charge air cooler include one or more of a water release amount from the charge air cooler, a water release rate from the charge air cooler, a water storage amount in the charge air cooler, and a water storage rate in the charge air cooler. Adjusting engine operation includes one or more of adjusting spark timing and mass air flow in response to one of the water release amount increasing above a threshold amount or the water release rate increasing above a threshold rate. Adjusting engine operation may also include one or more of adjusting vehicle grille shutters, engine cooling fans, and a charge air cooler coolant pump to decrease a cooling efficiency of the charge air cooler in response to the water storage rate increasing above a threshold rate. Adjusting engine operation may further include increasing engine airflow to purge condensate from the charge air cooler in response to the water storage amount increasing above a threshold amount. Additionally, generating diagnostics includes one or more of diagnosing function of the first oxygen sensor and the second oxygen sensor and/or diagnosing errors in a charge air cooler efficiency and condensate model.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
    determining an estimated amount of water in charge air exiting a charge air cooler based on an output of an oxygen sensor positioned downstream of the charge air cooler; and
    adjusting engine actuators based on the estimated amount of water.

2. The method of claim 1, wherein the oxygen sensor is positioned at an outlet of the charge air cooler and wherein the oxygen sensor and charge air cooler are positioned in an intake passage upstream of engine cylinders.

3. The method of claim 1, further comprising operating the oxygen sensor in a variable voltage mode responsive to an exhaust gas recirculation flow being at or greater than a threshold.

4. The method of claim 3, wherein the threshold is based on a maximum exhaust gas recirculation flow rate for which water is a major diluent in the charge air.

5. The method of claim 3, wherein operating the oxygen sensor in the variable voltage mode includes increasing a reference voltage of the oxygen sensor from a base, first voltage to a second voltage, the second voltage higher than the first voltage.

6. The method of claim 5, wherein the estimated amount of water is estimated based on a difference in pumping current when increasing the reference voltage from the first voltage to the second voltage and wherein the estimated amount of water is further based on a saturation water value at an outlet temperature condition of the charge air cooler.

7. The method of claim 1, further comprising operating the oxygen sensor in one or more of a base mode and a variable voltage mode responsive to an exhaust gas recirculation flow being less than a threshold.

8. The method of claim 1, wherein adjusting engine actuators based on the estimated amount of water includes one or more of adjusting spark timing and/or limiting an increase in engine airflow in response to the estimated amount of water in the charge air exiting the charge air cooler being greater than a threshold.

9. The method of claim 1, wherein the estimated amount of water in the charge air exiting the charge air cooler is further based on a second output of a second oxygen sensor positioned upstream of the charge air cooler.

10. The method of claim 9, further comprising adjusting engine actuators based on charge air cooler water storage parameters, the water storage parameters including one or more of a water release amount from the charge air cooler, a water release rate from the charge air cooler, a water storage amount in the charge air cooler, and a water storage rate in the charge air cooler, the water storage parameters based on the output of the oxygen sensor positioned downstream of the charge air cooler and the second output of the second oxygen sensor positioned upstream of the charge air cooler.

11. An engine method, comprising:
operating a first oxygen sensor positioned at an outlet of a charge air cooler in one or more of a base mode and a variable voltage mode responsive to an exhaust gas recirculation flow relative to a threshold; and
adjusting engine actuators based on water storage parameters at the charge air cooler, the water storage parameters estimated based on an output of the first oxygen sensor.

12. The method of claim 11, wherein the water storage parameters include an amount of water in charge air exiting the charge air cooler and wherein adjusting engine actuators includes one or more of adjusting spark timing and limiting engine airflow responsive to the amount of water in the charge air exiting the charge air cooler increasing above a threshold amount.

13. The method of claim 12, wherein the amount of water is estimated based on a pumping current of the first oxygen sensor and a saturation water value at an outlet temperature condition of the charge air cooler.

14. The method of claim 12, wherein adjusting spark timing includes advancing spark timing when a pedal position is increasing and retarding spark timing when the pedal position is below a threshold position.

15. The method of claim 11, wherein the water storage parameters further include a water release rate from the charge air cooler, a water storage rate at the charge air cooler, and a water storage amount at the charge air cooler, wherein the exhaust gas recirculation flow is an estimated flow of exhaust gas flowing from an exhaust passage to an intake passage via an exhaust gas recirculation passage, where the exhaust gas recirculation passage is coupled to the intake passage upstream of the charge air cooler, and wherein the charge air cooler and first oxygen sensor are positioned in the intake passage upstream of engine cylinders.

16. The method of claim 15, wherein the water release rate, the water storage rate, and the water storage amount are based on the output of the first oxygen sensor and an output of a second oxygen sensor positioned at an inlet of the charge air cooler.

17. The method of claim 16, wherein adjusting engine actuators includes one or more of adjusting spark timing and mass air flow in response to the water release rate increasing above a threshold rate.

18. The method of claim 16, wherein adjusting engine actuators includes one or more of adjusting vehicle grille shutters, engine cooling fans, and a charge air cooler coolant pump to decrease a cooling efficiency of the charge air cooler in response to the water storage rate increasing above a threshold rate and wherein adjusting engine actuators includes increasing engine airflow to purge condensate from the charge air cooler in response to the water storage amount increasing above a threshold amount.

19. An engine system, comprising:
an intake manifold;
a charge air cooler positioned upstream of the intake manifold;
a first oxygen sensor positioned at an outlet of the charge air cooler; and
a controller with computer readable instructions for adjusting engine actuators based on an amount of water in charge air exiting the charge air cooler, the amount of water estimated based on an output of the first oxygen sensor.

20. The system of claim 19, further comprising a second oxygen sensor positioned at an inlet of the charge air cooler and wherein engine actuators are further adjusted based on water storage at the charge air cooler, the water storage estimated based on the output of the first oxygen sensor and an output of the second oxygen sensor.

* * * * *